United States Patent [19]

Kurakake et al.

[11] Patent Number: 4,890,046
[45] Date of Patent: Dec. 26, 1989

[54] NUMERICAL CONTROL APPARATUS
[75] Inventors: Mitsuo Kurakake, Hino; Keiji Sakamoto, Hachioji, both of Japan
[73] Assignee: Fanuc Ltd, Minamitsuru, Japan
[21] Appl. No.: 231,853
[22] PCT Filed: Dec. 11, 1987
[86] PCT No.: PCT/JP87/00967
  § 371 Date: Jul. 29, 1988
  § 102(e) Date: Jul. 29, 1988
[87] PCT Pub. No.: WO88/04445
  PCT Pub. Date: Jun. 16, 1988
[30] Foreign Application Priority Data
  Dec. 12, 1986 [JP] Japan ............... 61-296387
[51] Int. Cl.⁴ .............................. G05B 11/01
[52] U.S. Cl. ...................... 318/630; 318/600; 318/661; 318/561
[58] Field of Search ........... 318/600, 630, 661, 561
[56] References Cited
  U.S. PATENT DOCUMENTS
  3,886,424  5/1975  Hoshima ................. 318/630
  4,533,859  8/1985  Johnstone ............... 318/661
  4,535,277  8/1985  Kurakabe ............... 318/561
  4,743,823  5/1988  Fujita .................... 318/630

Primary Examiner—William M. Shoop, Jr.
Assistant Examiner—Saul M. Bergmann
Attorney, Agent, or Firm—Staas & Halsey

[57] ABSTRACT

A numerical control apparatus according to the invention reliably eliminates the influence on positional accuracy of static resistance and dynamic resistance, which act as disturbance upon a servo loop, when a semi-closed loop forms a servo system for positioning, by numerical control, a machine tool or the like driven by a servomotor. The numerical control apparatus has a backlash correction function and supplies the servo system with a backlash correction data BL(i) distinguished from an ordinary move command BL(i). In order to eliminate a shift from a commanded position due to the aforementioned disturbance, an offset command corresponding to frictional torque Fa in the mechanical system of the machine tool or the like is applied to the servo system as a torque correction signal FR(i) in accordance with the backlash correction data BL(i).

2 Claims, 2 Drawing Sheets

NUMERICAL CONTROL APPARATUS

FIELD OF THE INVENTION

This invention relates to a numerical control apparatus, which has a backlash correction function for a move command, for effectively carrying out positioning in a semi-closed loop servo system.

BACKGROUND OF THE INVENTION

A semi-closed loop-type control circuit of the kind shown in FIG. 3 is employed as a CNC servo-control circuit. In the Figure, an information processing circuit X comprises a CPU and a memory and forms a command signal for a servomotor. A servomechanism Y is constituted by a comparator circuit (a) for comparing the command signal and a signal from a position detector e, a servo drive circuit b, a servomotor c, a velocity detector d and a position detector e employing a resolver or a pulse encoder, and is adapted to control a machine Z such as a table via a ball screw shaft f.

As illustrated, the semi-closed loop system controls a load by performing position detection at a portion of the motor shaft or ball screw shaft in front to be finally controlled. Control is performed accurately up to the motor shaft or ball screw shaft, and from this point onward control depends on the precision of the machine.

FIG. 4 is a block diagram of such a servo-control system, in which K denotes position gain, $k_1$ and $k_2$ gains, $K_T$ a torque constant, $T_L$ disturbance, and $J_m$ rotor inertia.

In control of the machine by such a semi-closed loop system, a response delay due to backlash in the mechanical system arises when there is a change in the direction of servomotor rotation. In order to improve upon this delay with respect to a move command, the conventional practice is to supply the servo system with a backlash correction signal together with the move command signal.

FIG. 2 is a block diagram illustrating an example of a control circuit in which a backlash correction signal BL(i) of this kind is inputted together with a move command signal MC(i) to the servo system to form a torque command. In FIG. 2, an integration term $Z^{-1}$ is expressed using a Z conversion (pulse transfer function conversion). VEL(i) indicates a fed back velocity signal, and POS(i) represents an amount of movement in a sampling period T, namely a fed back position signal.

In this conventional control circuit, the response delay of the servo system is improved by inputting the backlash correction signal to the servo system. However, since frictional resistance is present in an actual servomotor and machine, positional displacement based on a response delay still remains when the servomotor reverses its direction of rotation. If a machine tool is to be controlled along, e.g., a circular arc by controlling a plurality of axes simultaneously, positional displacement caused by frictional resistance in the machine tool will hinder machining along a true circle.

SUMMARY OF THE INVENTION

The present invention has been devised in order to solve the aforementioned problem and its object is to provide a numerical control apparatus capable of improving the positional precision in a semi-closed loop servo system by forming a torque command that takes frictional resistance into consideration.

In accordance with the present invention, there is provided a numerical control apparatus of a semi-closed loop servo system for controlling a servomotor by forming a position command by a move command and a backlash correction command for backlash at a mechanical load, comprising: discriminating means for discriminating, on the basis of the backlash correction command, a quadrant position prevailing when the direction of rotation of the servomotor reverses; correcting means for forming a torque correction signal corresponding to frictional resistance of the mechanical load; and arithmetic means for computing a velocity command decided from the position command by the torque correction signal.

Accordingly, in the numerical control apparatus of the present invention, a position command regarding the servo system and a backlash correction command are applied to a comparator to which the servomotor position signal is inputted, and a torque correction signal corresponding to the frictional torque of the machine constituting the load is applied to the servo system as offset data in dependence upon the quadrant position which prevails when the direction in which the servomotor rotates reverses. Thus, accurate positional control is realized by eliminating the influence of friction with regard to the load.

DESCRIPTION OF THE PREFERRED EMBODIMENT

An embodiment of the present invention will now be described in detail with reference to the drawings.

Figure 1A:
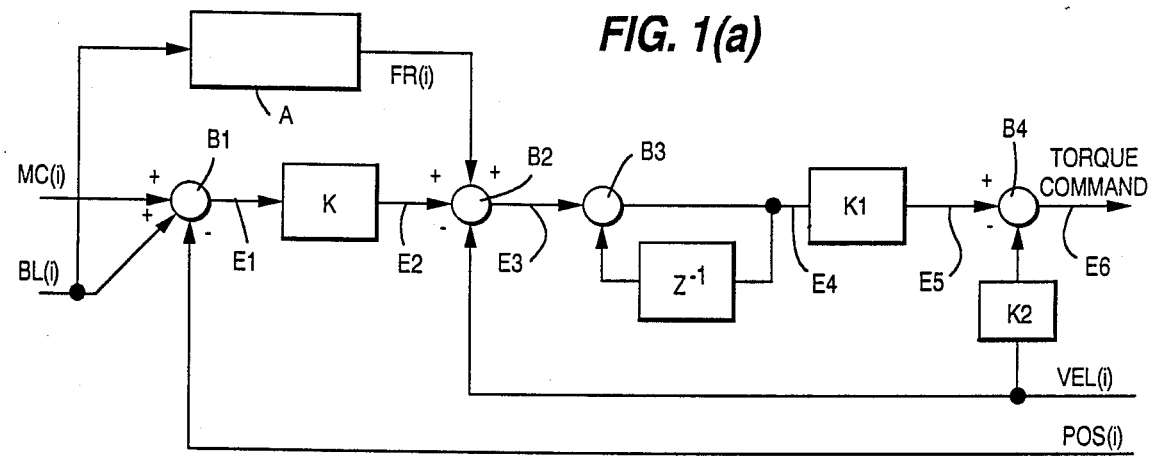
FIGS. 1(a), (b) are a block diagram and flowchart illustrating the general arrangement of the present invention.

FIG. 1(a) is a block diagram illustrating the general arrangement if the invention. The move command MC(i) formed by an information processing circuit and the backlash correction command BL(i) are inputted to a comparator $B_1$ of a servo system, and an error signal $E_1$ is formed by comparing these commands with the amount of movement of a servomotor output shaft in a sampling period T, namely the position signal POS(i). The error signal $E_1$ is multiplied by the position gain K to form a velocity command $E_2$, which is applied to a comparator $B_2$. Also inputted to the comparator $B_2$ are the servomotor velocity signal VEL(i) and a torque correction signal FR(i) obtained from a correction circuit A by processing the backlash correction command BL(i) under predetermined conditions.

Figure 1B:
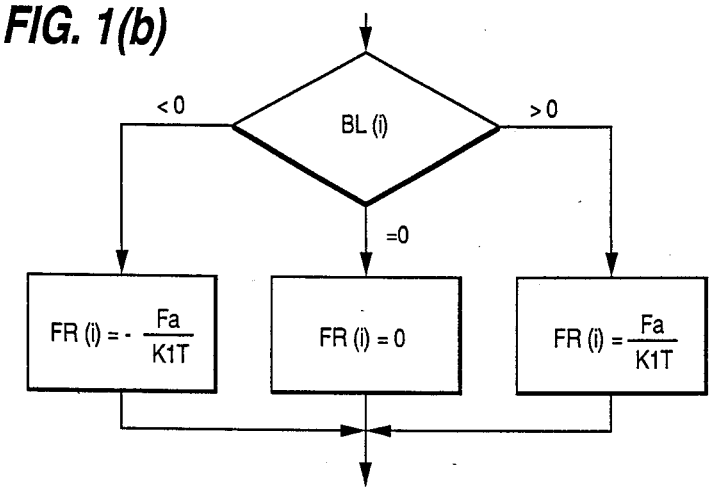

FIG. 1(b) is a flowchart for forming the torque correction signal FR(i) in the correction circuit A. Solely the backlash correction command BL(i) is inputted to the correction circuit A, which outputs the torque correction signal FR(i) corresponding to frictional resistance in accordance with the quadrant position that prevails when the servomotor reverses direction. More specifically, a frictional resistance value Fa of the machine coupled to the servomotor is preset, and the following torque correction command FR(i) is computed in dependence upon the quadrant position, which is discriminated by the backlash command BL(i), prevailing when the servomotor reverses direction:

(1) $FR(i) = -Fa/(K_1T)$ for the third quadrant $[BL(i)<0]$;
(2) $FR(i) = 0$ for $BL(i) - 0$; and
(3) $FR(i) = Fa/(K_1T)$ for the first quadrant $[BL(i)>0]$.

Figure 2:
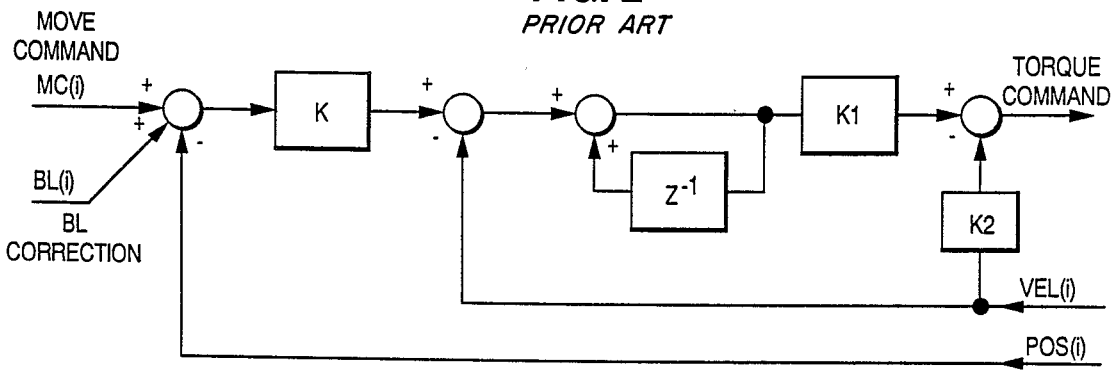
FIG. 2 is a block diagram illustrating an example of a circuit according to the prior art.
Figure 3:
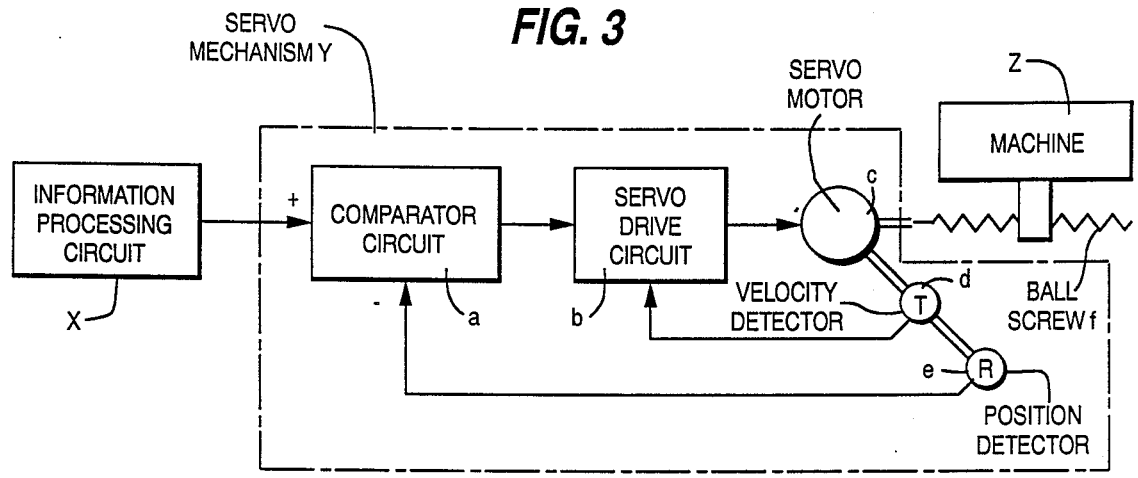
FIG. 3 is a circuit diagram of a servomotor control apparatus using a semi-closed loop system.
Figure 4:
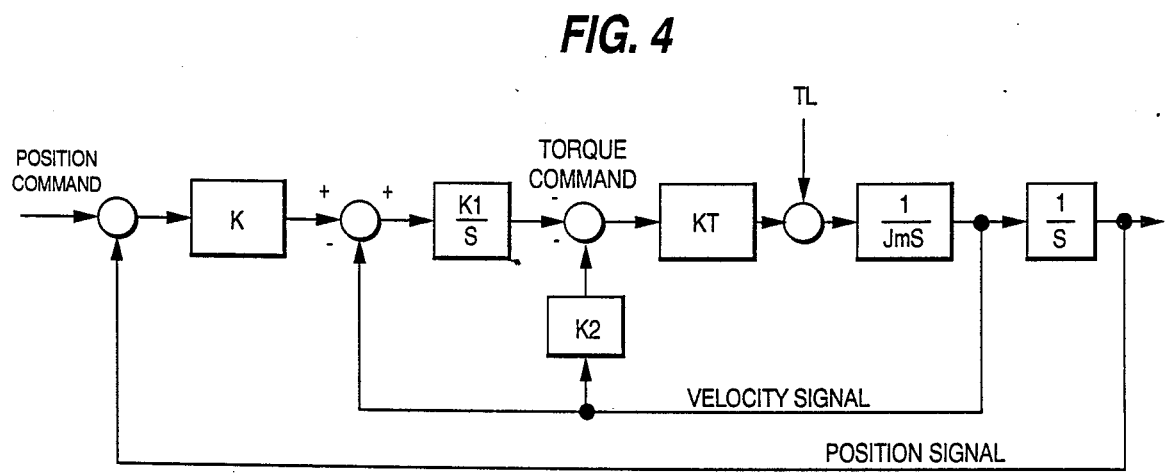
FIG. 4 is a block diagram of a servo-control system.

In accordance with the correction circuit A of the control apparatus constructed as set forth above, the torque correction signal corresponding to frictional resistance is applied to the comparator $B_2$ as offset data, and a velocity command $E_3$ from the comparator $B_2$ is inputted to a comparator $B_3$ as a signal which compensates for frictional resistance. Subsequent processing is the same as in the example of the prior-art circuit of FIG. 2, in which the command signal is corrected by the integration term $Z^{-1}$ and the gains $k_1$, $k_2$ so that a comparator $B_4$ may form a torque command $E_6$ for the servomotor.

In accordance with the numerical control apparatus of the present invention, as clarified by the description of this embodiment, a backlash correction regarding the move command is carried out in the semi-closed loop servo system, and a torque correction can be achieved by taking the frictional resistance of the mechanical system into consideration. As a result, there is an improvement in positional displacement based on a response delay at the time of a change in the rotating direction of the servomotor.

Though an embodiment of the present invention has been described, the invention is not limited thereto but can be modified in various ways without departing from the scope of the claims.

The numerical control apparatus of the present invention can be utilized as a semi-closed loop servo-control system adapted to effect a backlash correction with regard to a position command.

We claim:

1. A numerical control apparatus for controlling a semi-closed loop servo-control system which controls a servomotor by forming a position command by a move command and a backlash correction command for backlash at a mechanical load, comprising:

discriminating means for discriminating, on the basis of the backlash correction command, a quadrant position prevailing when the direction of rotation of the servomotor reverses;

correcting means for forming a torque correction signal corresponding to frictional resistance of the mechanical load; and arithmetic means for computing a velocity command decided from said position command by the torque correction signal.

2. A numerical control apparatus according to claim 1, characterized in that said correcting means is adapted to store a frictional resistance value of the mechanical load and form the torque correction signal in accordance with a predetermined offset parameter.

* * * * *

UNITED STATES PATENT AND TRADEMARK OFFICE
CERTIFICATE OF CORRECTION

PATENT NO. : 4,890,046
DATED : December 26, 1989
INVENTOR(S) : Mitsuo Kurakake et al.

It is certified that error appears in the above-identified patent and that said Letters Patent is hereby corrected as shown below:

Col. 1, line 25, after "front" insert --of the machine z, such as a table, which is the object--.

Col. 2, line 45 "if" s/b --of--.

Signed and Sealed this

Nineteenth Day of February, 1991

*Attest:*

HARRY F. MANBECK, JR.

*Attesting Officer*   *Commissioner of Patents and Trademarks*